United States Patent
Garcia et al.

(10) Patent No.: US 10,511,709 B1
(45) Date of Patent: *Dec. 17, 2019

(54) METHODS AND SYSTEMS FOR AUTHENTICATING A USER ON A CALL

(71) Applicant: United Services Automobile Association (USAA), San Antonio, TX (US)

(72) Inventors: Patricio H. Garcia, San Antonio, TX (US); Amanda Jean Segovia, San Antonio, TX (US); Hector J. Castillo, San Antonio, TX (US); Susan Cass Mason, San Antonio, TX (US); Robert Craig Korom, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/228,406

(22) Filed: Dec. 20, 2018

Related U.S. Application Data

(63) Continuation of application No. 15/854,499, filed on Dec. 26, 2017, now Pat. No. 10,165,110, which is a continuation of application No. 15/389,671, filed on Dec. 23, 2016, now Pat. No. 9,876,902, which is a continuation of application No. 14/979,941, filed on Dec. 28, 2015, now Pat. No. 9,531,868, which is a continuation of application No. 14/553,681, filed on Nov. 25, 2014, now Pat. No. 9,225,828.

(60) Provisional application No. 61/993,941, filed on May 15, 2014.

(51) Int. Cl.
H04M 1/56 (2006.01)
H04M 15/06 (2006.01)
H04M 3/38 (2006.01)

(52) U.S. Cl.
CPC .......... *H04M 3/382* (2013.01); *H04M 3/385* (2013.01); *H04M 2203/6045* (2013.01); *H04M 2203/6054* (2013.01); *H04M 2203/6072* (2013.01); *H04M 2203/6081* (2013.01)

(58) Field of Classification Search
None
See application file for complete search history.

(56) References Cited

U.S. PATENT DOCUMENTS

| | | | |
|---|---|---|---|
| 9,225,828 B1 * | 12/2015 | Garcia | H04M 3/382 |
| 9,531,868 B1 | 12/2016 | Garcia | |
| 10,165,110 B1 * | 12/2018 | Garcia | H04M 3/382 |
| 2005/0135579 A1 | 6/2005 | Creamer et al. | |

(Continued)

OTHER PUBLICATIONS

U.S. Appl. No. 15/854,499, filed Dec. 26, 2017, Methods and Systems for Authenticating a User on a Call.

(Continued)

*Primary Examiner* — Quoc D Tran
(74) *Attorney, Agent, or Firm* — Perkins Coie LLP

(57) ABSTRACT

Methods and systems described in this disclosure allow customers to quickly be authenticated. In some embodiments, a device and a user verifier are associated with a user profile. When a call is received from the device, the user may be requested to input the user verifier. After verifying that the device is unique to the user and that the user verifier matches the user verifier associated with the user profile, the user may be authenticated to the call or activity.

20 Claims, 9 Drawing Sheets

(56) References Cited

U.S. PATENT DOCUMENTS

| | | |
|---|---|---|
| 2009/0061872 A1 | 3/2009 | Hicks |
| 2014/0081732 A1 | 3/2014 | Farmer et al. |
| 2014/0161241 A1 | 6/2014 | Baranovsky et al. |
| 2015/0121455 A1 | 4/2015 | Siegel |

OTHER PUBLICATIONS

U.S. Appl. No. 15/389,671, filed Dec. 23, 2016, U.S. Pat. No. 9,876,902, Jan. 23, 2018, Methods and Systems for Authenticating a User on a Call.
U.S. Appl. No. 14/979,941, filed Dec. 28, 2015, U.S. Pat. No. 9,531,868, Dec. 27, 2016, Methods and Systems for Authenticating a User on a Call.
U.S. Appl. No. 14/553,681, filed Dec. 15, 2014, U.S. Pat. No. 9,225,828, Dec. 29, 2015, Methods and Systems for Authenticating a User on a Call.
U.S. Appl. No. 61/993,941, filed May 15, 2014, Methods and Systems for Authenticating a User on a Voiceline.

* cited by examiner

A strong password is your first line of defense in protecting your accounts and finances. See how strong your password is and make sure it meets our latest security standards when you update your password.

Security Preferences

Logon Credentials
Online ID    » Change
Password    » Change
PIN    » Change

Logon Credentials Recovery ☒ Edit
Methods to obtain your logon credentials if you forget them.
E-mail    Enabled
Text Message    Enabled
Verification Questions    Enabled

Security Questions ☒ Edit
Name of your first employer?
First name of paternal grandmother?
First name of your best man?

Logon Method ☒ Edit
Learn about Logon Options
Computer Recognition    Enabled
Remember this computer?    Yes
Remember PIN on recognized computers?    No
Security level on unrecognized computers    Standard
Replaced a computer?    » Clear Your List of Recognized Computers

Quick Logon for Mobile    ☒ Disable
Quick Logon for Mobile    Enabled

Secure Logon
Learn about Secure Logon
Enable This Computer    Disabled    » Enable
Quick Access for Voiceline    Disabled    ☒ Disable
Quick Access for Voiceline    Enabled

Personal Financial Management Tools    ☒ Change
Block financial management tools from accessing your accounts.
TURBOTAX Access    Enabled

METHODS AND SYSTEMS FOR AUTHENTICATING A USER ON A CALL

CROSS REFERENCE TO RELATED APPLICATIONS

This application is a continuation of U.S. patent application Ser. No. 15/854,499, filed on Dec. 26, 2017, entitled "METHODS AND SYSTEMS FOR AUTHENTICATING A USER ON A CALL," now allowed, which is a continuation of U.S. patent application Ser. No. 15/389,671, filed on Dec. 23, 2016, entitled "METHODS AND SYSTEMS FOR AUTHENTICATING A USER ON A CALL," now U.S. Pat. No. 9,876,902, issued on Jan. 23, 2018, which is a continuation of U.S. patent application Ser. No. 14/979,941, filed on Dec. 28, 2015, entitled "METHODS AND SYSTEMS FOR AUTHENTICATING A USER ON A CALL," U.S. Pat. No. 9,531,868, issued on Dec. 27, 2016, which is a continuation of U.S. patent Ser. No. 14/553,681, filed on Nov. 25, 2014, entitled "METHODS AND SYSTEMS FOR AUTHENTICATING A USER ON A CALL," now U.S. Pat. No. 9,225,828, issued on Dec. 27, 2016, which is a non-provisional of and claims priority to U.S. Provisional Application No. 61/993,941, filed on May 15, 2014, entitled "METHODS AND SYSTEMS FOR AUTHENTICATING A USER ON A VOICELINE," each of which are hereby incorporated by reference in their entireties for all purposes.

TECHNICAL FIELD

Various embodiments of the present disclosure generally relate to authentication. More specifically, various embodiments of the present disclosure relate to methods and systems for authenticating a user on a call.

BACKGROUND

Customers call into an organization for various reasons such as to inquire about a bill, receive a status update, receive the latest information relating to a service the organization provides, or obtain information about an account the customer holds with the organization. For example, customers may call to request a status of a financial account or insurance claim. Before any information is provided, the caller may be asked to provide authenticating information, generally in the form of personally identifying information.

BRIEF DESCRIPTION OF THE DRAWINGS

Embodiments of the present disclosure will be described and explained through the use of the accompanying drawings in which:

FIG. 8 depicts an example of a user interface that can be used to select preferences in accordance with various embodiments of the disclosure.

Figure 1:
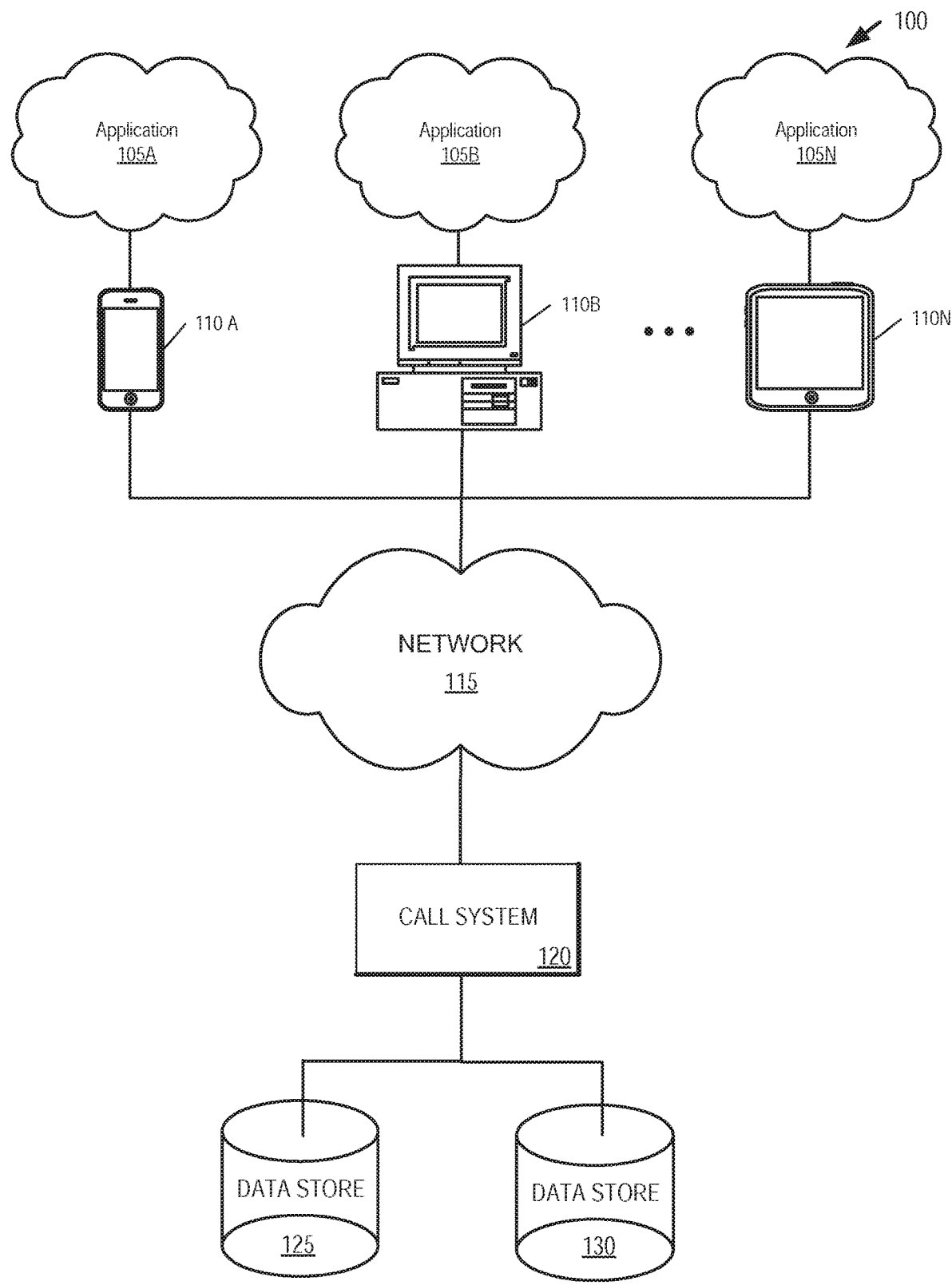
FIG. 1 illustrates an example of a network-based operating environment in accordance with various embodiments of the disclosure.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while embodiments of the present disclosure are amenable to various modifications and alternative forms, specific embodiments have been shown by way of example in the drawings and are described in detail below. The intention, however, is not to limit the disclosure to the particular embodiments described. On the contrary, the disclosure is intended to cover all modifications, equivalents, and alternatives falling within the scope of the disclosure.

DETAILED DESCRIPTION

Various embodiments of the present disclosure generally relate to authentication. More specifically, various embodiments of the present disclosure relate to methods and systems for authenticating a user on a call.

Methods and systems are described that allow users to more efficiently be authenticated during a call. In traditional systems, a user provides identification information such as a member number, name, social security number, or other personal information. Then, to verify the user's identity, the user is asked to provide verification information such as a birth date, address, name of childhood best friend, mother's maiden name, etc. The verification information is then compared to previously collected information. If the verification information is determined to be correct based on a comparison with the previously collected information, the user is authenticated, allowing the user to proceed with the call and/or to partake in activities (e.g., transfer funds, withdraw money, file an insurance claim, etc.).

The user may find the traditional authentication process burdensome. For example, some users forget their member number or other verification information. Often times, users are hesitant to give out their social security number. Additionally, the traditional authentication process may be inefficient from the organizational perspective. For example, the user may be calling on a toll-free line in which the organization is charged per minute. Thus, the faster the user is authenticated, the less cost the organization will incur. In some cases, the authentication process described herein is accomplished via an interactive voice response system. Alternatively, the authentication process may take place while the user speaks with a customer service representative.

This disclosure describes efficient authentication processes designed to reduce inefficiencies in the authentication process during calls. Various embodiments may provide one or more of the following technological improvements: 1) improved authentication techniques and systems within a call system; 2) improved security and confidentiality by reducing transmission of passwords, social security numbers, account numbers, and other confidential information; 3) improved user experience by removal or reduction of security prompts without loss of security; 4) reduction of call time by improving user authentication and verification techniques; and/or 5) improving automated user and device identification and/or verification.

In some embodiments, the user may be enrolled in a quick access service, allowing the user to be authenticated to a call or activity on a call simply by providing (e.g., inputting or speaking) a user verifier. A unique identifier or unique device identifier (e.g., phone number) and a user verifier (e.g., personal identification number ("PIN")) may be associated with a user profile of a user. When the user calls an organization on the device, the organization may identify the user based on the unique identifier or unique device identifier. If the user and/or device are enrolled in the quick access service, the user can simply input the user's user verifier. Once the user verifier is verified, the user may be authenticated.

In one or more embodiments, the user verifier does not include personally identifiable information and may be selected by the user. In some embodiments, the system may monitor device registration and only allow a device to be associated with one user prior to being enrolled in the quick authentication service. More than one device may be associated with the user profile and more than one device may be enrolled in or enabled for the quick access service. In various embodiments, the quick access service may be enabled or enrolled for more than one device for a user.

In some embodiments, a user enrolled in the quick access service may call the organization on a device that is not associated with the user's user profile. In such cases, the user may be authenticated using methods other than the quick access service (e.g., the user may be required to provide personally identifying information). After authentication, if the user is eligible, the user may be asked whether the user would like to add the device to the user's user profile and enable quick access service for the device.

If a user or device is not enrolled in the quick access service and the user or device is eligible for enrollment, an enrollment offer may be made to the user. In some embodiments, the quick access service program enrollment offer may be made only if the user has not been previously asked within a certain period of time. In some embodiments, when an enrollment request is made, the request date and time may be logged.

In the following description, for the purposes of explanation, numerous specific details are set forth in order to provide a thorough understanding of embodiments of the present disclosure. It will be apparent on reading the disclosure, however, to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110N (such as a mobile device, a mobile phone, a telephone, a tablet computer, a mobile media device, a mobile gaming device, a vehicle-based computer, a dedicated terminal, a public terminal, desktop or laptop computer, a kiosk, etc.). In some embodiments, applications 105A-105N may be stored on one or more of computing devices 110A-110N or may be stored remotely on a server (in the "cloud"). These computing devices can include mechanisms for receiving and sending traffic by connecting through network 115 to call system 120 and data stores 125 and 130.

Computing devices 110A-110N may be configured to communicate via the network 115 with call system 120. In some embodiments, computing devices 110A-110N can retrieve or submit information to call system 120 and run one or more applications with customized content retrieved by call system 120 and data stores 125 and 130. For example, computing devices 110A-110N can execute a browser application or a customized client to enable interaction between the computing devices 110A-110N, call system 120, and data stores 125 and 130.

Network 115 can include any combination of local area and/or wide area networks, using both wired and wireless communication systems. In one embodiment, network 115 uses standard communications technologies and/or protocols. Thus, network 115 may include links using technologies such as Ethernet, 802.11, worldwide interoperability for microwave access (WiMAX), 3G, 4G, CDMA, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies and/or formats including hypertext markup language (HTML) or extensible markup language (XML). In addition, all or some links can be encrypted using conventional encryption technologies such as secure sockets layer (SSL), transport layer security (TLS), and Internet Protocol security (Ipsec).

Call system 120 can be running on one or more servers and can be used to create user profiles, enroll users and devices in a quick access service, identify users, verify users, authenticate users, check call history, route calls, or to perform other activities. Call system 120 may be communicably coupled with data stores 125 and 130 and computing devices 110A-110N and may communicate, access or receive data (e.g., identification information, verification information, tokens, voice authentication services, etc.) from computing devices 110A-110N and data stores 125 and 130. Call system 120 may be associated with a membership organization, and the users may be members or potential members of the membership organization. The organization may be a financial institution and/or an insurance company.

The quick access service provided by call system 120 may be customized for callers based on information received through various user interfaces running on computing devices 110A-110N or other interactions, communications, and/or other inputs (e.g., e-mails, tokens, and/or communications via other channels). Call system 120 can be calibrated/configured by individual companies or service providers based on user needs and/or business objectives. For example, companies may have different routing procedures or different authentication requirements.

In some cases, call system 120 may receive a call and communicate with data stores 125 and 130 to determine an enrollment status of the calling device and/or the user based on a device identifier (e.g., phone number of device). The user may be identified based on the device identifier if the device is associated with the user profile. If the user is enrolled in the quick access service and the quick access service is enabled for the device, call system 120 may authenticate the user after the user provides a user verifier to verify the user's identity. If the quick access service for the device is not enabled (i.e., the device is not enrolled), the user may be asked whether the user would like to add the device into the user's user profile so that the user may be authenticated via the quick access service for future calls on this device. If the user or the device is not enrolled, the user may be asked whether the user wants to be enrolled and whether the user wants to enable the device for quick access service.

In some embodiments, all users are eligible for quick access service whereas in other embodiments, only certain users are eligible for quick access service. In other embodiments, a caller profile may be created and used in conjunction with other profiles, scores, and/or business practices to determine whether the user may be interested in enrolling in quick access service. For example, the user generally may not be offered enrollment if the user has denied previous enrollment offers in the past six months. However, if the user's spouse or other relative has enrolled in the quick access service in recently (e.g., past month or other predetermined amount of time), the user may be offered enrollment regardless of the previously declined enrollment offers. In some embodiments, call system 120 includes various data processing and analytic tools that allow for the monitoring and evaluation of users and user information retrieved from data stores 125 and 130.

Data stores 125 and 130 can be used to manage storage and access to user data such as call history, registered user devices, user identifications, user identifiers, user verifiers, voice profiles, token IDs, financial information, authentication history, user preferences, member identification numbers, device fingerprints, personal identification numbers, the period of time in between last enrollment offers, a last enrollment request date, and other information. Data stores 125 and 130 may be a data repository of a set of integrated objects that are modeled using classes defined in database schemas. Data stores 125 and 130 may further include flat files that can store data. Call system 120 and/or other servers may collect and/or access data from the data stores 125 and 130.

Figure 2:
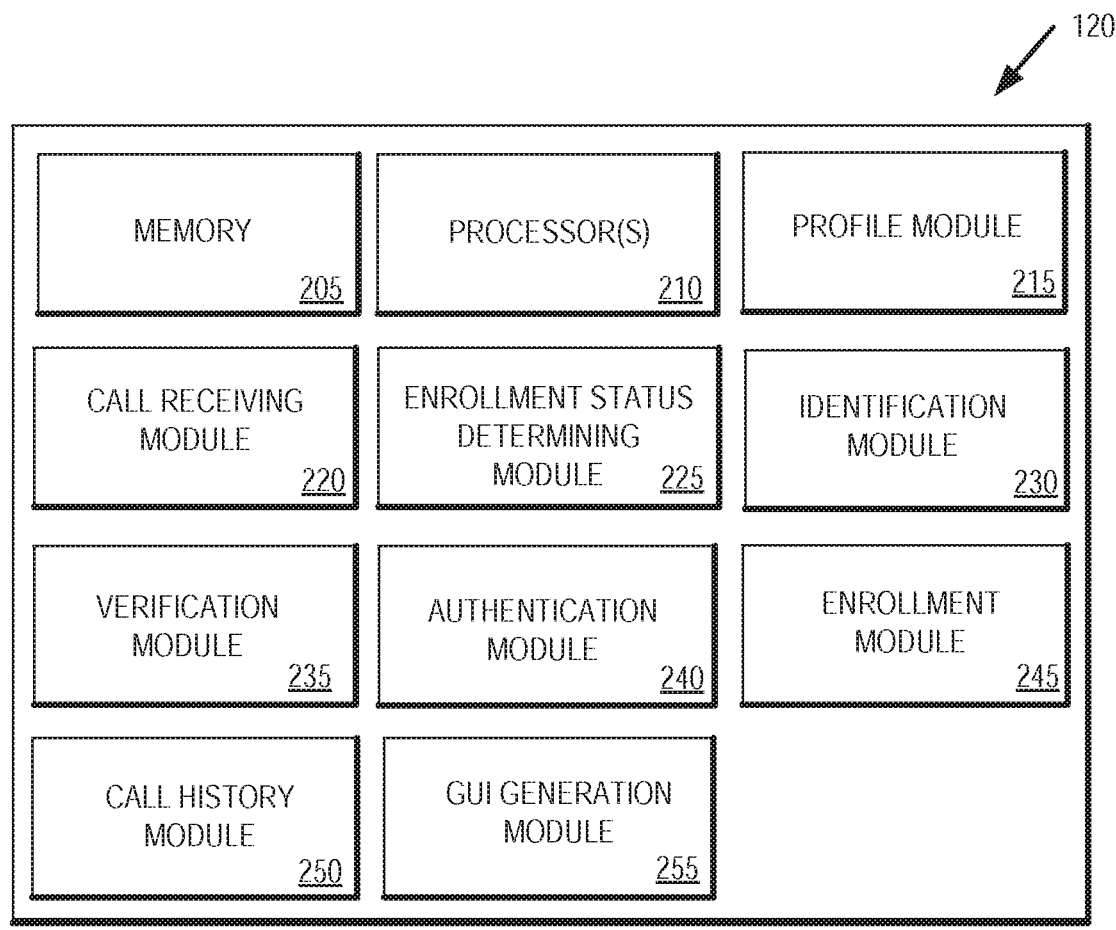
FIG. 2 is a block diagram illustrating components that can be included in a call system in accordance with various embodiments of the disclosure.

FIG. 2 is a block diagram illustrating components that can be included in a call system such as call system 120. According to the embodiments shown in FIG. 2, call system 120 may include memory 205, processor(s) 210, profile module 215, call receiving module 220, enrollment status determining module 225, identification module 230, verification module 235, authentication module 240, enrollment module 245, call history module 250, and graphic user interface (GUI) generation module 255. Other embodiments of the present disclosure may include some, all, or none of these modules and components along with other modules, applications, and/or components. The modules illustrated in FIG. 2 may be hardware, firmware, software, or a combination thereof. Some embodiments may incorporate two or more of these modules into a single module and/or associate a portion of the functionality of one or more of these modules with a different module.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of profile module 215, call receiving module 220, enrollment status determining module 225, identification module 230, verification module 235, authentication module 240, enrollment module 245, call history module 250, and GUI generation module 255.

Profile module 215 may be capable of creating a user profile that includes a user verifier and one or more device identifiers, among other information. The user verifier is associated with a user. In some embodiments, the user verifier may need to be established and known by the user prior to enrollment in the quick access service. Profile module 215 may assign the user verifier or may receive a selection of a user verifier from the user. The device identifier identifies the device and may be information collected or received from the device (e.g., a phone number, device fingerprint, etc.). The device identifier may be unique in that the device identifier is unique to the device. The user profile may include information such as employer, birth date, familial status, financial information, etc. Fields that may be included in the user profile include, but are not limited to: first name; last name; member number; birth date; gender; marital status; citizenship; military status; military rank; home phone number; business phone number; cell phone number; mobile device ID; personal computer IP address; home address; vehicle year, make, and model; and user voice print.

A user profile may have more than one associated device and the user may choose which devices to enroll in the quick access service. For example, the user may have a cellular phone and a home phone that is shared with family members. The user may choose to associate both devices with a user profile of the user but may choose only to enroll the cellular phone for the quick access service because other family members may call the organization from the home phone and/or may associate the home phone with their user profiles.

Call receiving module 220 may be capable of receiving a call from a user over a communications network. The call may be made via a mobile device, landline telephone, laptop, desktop, or other device capable of making a call. When the call is being made, call receiving module 220 may collect or receive a device identifier or a unique identifier such as a phone number, device fingerprint, IP address, etc. The device identifier or the unique identifier is collected passively, meaning that the user does not have to take an action to provide the device identifier or the unique identifier.

Enrollment status determining module 225 may be capable of determining an enrollment status of a device and/or user in the quick access service. For example, call receiving module 220 may send the device identifier to enrollment status determining module 225, and enrollment status determining module 225 may determine whether the user and/or the device associated with the device identifier is enrolled in the quick access service.

To determine whether the user is enrolled in the quick access service, enrollment status determining module 225 may receive an identity of the user from identification module 230 and determine whether the user is enrolled in the quick access service by checking the user profile associated with the device. To determine whether the device associated with the device identifier is enrolled in the quick access service, enrollment status determining module 225 may determine whether the device in the user profile is enrolled in the quick access service.

If enrollment status determining module 225 determines that the user and/or the device is not enrolled in the quick access service, enrollment status determining module 225 may communicate the enrollment status to enrollment module 245 to determine whether the user and/or device is eligible to be enrolled in the quick access service and to offer enrollment accordingly.

Identification module 230 may be capable of identifying the user based on the device identifier of the calling device. If the device identifier is not associated with a user profile, the user may be asked to identify himself or herself (e.g., name, member number, etc.) and provide verification (e.g., social security number, birthday, etc.). If the device identifier is associated with a user profile, then the user may be identified automatically and verification module 235 may verify the user.

Verification module 235 may be capable of receiving identification information from identification module 230 or the user and verifying the identity of the user. For example, after the user has been identified via the device identifier, the user may be asked to input a user verifier (e.g., "I see you are calling from a device in your profile. Please enter or say your PIN."). Verification module 235 may compare the user verifier with previously stored information to verify the user's user verifier. If verification module 235 cannot verify the user, verification module 235 may request additional information from the user (e.g., social security number, birth date, member number, etc.) and/or transfer the call to a representative.

Authentication module 240 may be capable of authenticating the user to the call and/or to an activity when verification module 235 verifies the identity of the user. In some embodiments, the user is authenticated to a certain level (e.g., if the user provides certain information, the user can access additional information or partake in additional activities). Authenticating via the quick access service may provide a heightened level of authentication because authentication via the quick access service uses two-factor authentication (e.g., the user has been identified by something that the user has (e.g., device) and verified with something that the user knows (e.g., PIN)).

Enrollment module 245 may be capable of determining whether the user and/or device are eligible for enrollment. Enrollment module 245 may thereafter enroll the user and/or device in the quick access service if the user/device is eligible and if enrollment is desired. Eligibility for a user may depend on whether the user has disabled or opted out of the quick access service as determined by call history module 250 and/or whether the user knows the user's user verifier. If the user has opted out or disabled the quick access service, the device may still be eligible for quick access; however, the quick access service may not be allowed because the user has expressed a preference of opting out.

Eligibility for adding the device to the quick access service for a user may depend on whether the device is associated with another user profile. That is, in some embodiments, if the device is associated with another user profile, the device is not eligible for enrollment in the quick access service. In some embodiments, if the device is later added to a different user's user profile, the device may no longer be eligible for the quick access service. Additionally, if fraud has been detected either at the user level or at the device identifier or unique identifier level, the quick access service may be deactivated.

If the user and/or device are eligible for enrollment, enrollment module 245 may further determine whether an enrollment offer should be made to the user. For example, if the user has been provided with an enrollment offer within a previous period of time, enrollment module 245 may determine that the user should not be presented with an enrollment offer at this time (e.g., do not offer to the user if the user has been asked within the past six months).

If the user and/or device is eligible for enrollment and should be presented with an enrollment offer as determined by enrollment module 245, enrollment module 245 may offer enrollment to the user. If the user responds positively to an enrollment offer (i.e., wants to be enrolled), enrollment module 245 may enroll user and/or device by updating a user profile associated with the user to reflect the enrollment of the user and/or device. In some embodiments, the user chooses to be enrolled in the quick access service and has several devices previously associated with the user's user profile. During enrollment, the user may enroll or enable all eligible devices associated with the user profile or only selected devices. Enrollment may take place during any interaction with the user. For example, enrollment may take place during a call to the organization, on a mobile application, on a web portal, or through a text message. In some embodiments, the default device to enroll is the user device the user uses the most to call the organization. In some embodiments, the default device is the device being used to make the call. In some embodiments, the user is enrolled at the user level. For example, if a user has 1 to n devices associated with the user's user profile, each device that is eligible for the quick access service is enrolled when the user accepts the quick access enrollment. In other embodiments, the enrollment request for the quick access service includes providing a selection of device identifiers or unique identifiers to enroll in the quick access service and the user can select which device identifier or unique identifier should be enrolled.

In some embodiments, the user is required to provide a user verifier in order to enroll in the quick access service. If the user does not know the user verifier or if the user verifier is locked out (e.g., the user guessed wrong too many times) or the user needs to establish a user verifier, the user may be routed to a representative. Once the user knows his/her user verifier, the user can enroll.

Call history module 250 may be capable of reviewing the user's call history and maintaining a record of enrollment offers made to the user. Such information may be used by enrollment module 225 in determining whether an enrollment offer should be made to the user. For example, if the user has been asked recently (e.g., past three months) whether the user would like to enroll in the quick access program, the user will not be offered enrollment. Or, if the user has opted out of enrolling a particular device in the service, then call history module 250 ensures that enrollment module 245 does not offer enrollment for that device.

GUI generation module 255 is capable of generating one or more GUI screens that allow for interaction with a user. In at least one embodiment, GUI generation module 255 generates a graphical user interface receiving and/or conveying information to the user. For example, GUI generation module 255 may display an enrollment status of the user and the device.

Figure 3:
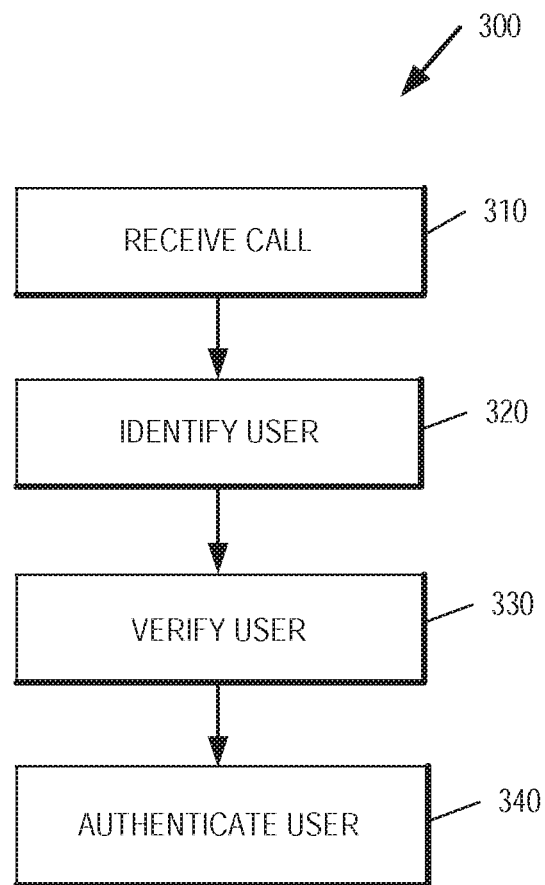
FIG. 3 is a flowchart illustrating a set of operations for authenticating a user in accordance with various embodiments of the disclosure.

FIG. 3 is a flowchart illustrating a set of operations 300 for authenticating a user during a call as described herein. In some embodiments, fewer than all of the operations are performed, whereas in other embodiments additional operations are performed. Moreover, in some embodiments, the operations may be performed in different orders or in parallel. The operations can be performed by call system 120 and/or various components of call system 120 illustrated in FIG. 2 such as memory 205, processor(s) 210, profile module 215, call receiving module 220, enrollment status determining module 225, identification module 230, verification module 235, authentication module 240, and GUI generation module 255.

Receiving operation 310 receives a call at an organization (e.g., phone bank, server, call system, etc.) from a user. The system may collect or receive a device identifier from the device, which is used by identifying operation 320 to identify the user. In some embodiments, identifying operation 320 may use the device identifier to retrieve a user profile associated with the device identifier. Verifying operation 330 verifies the user by asking the user for verifying information, such as a PIN, and checking the verifying information with verifying information in the user profile. Authenticating operation 340 authenticates the user when the user is verified.

Figure 4:
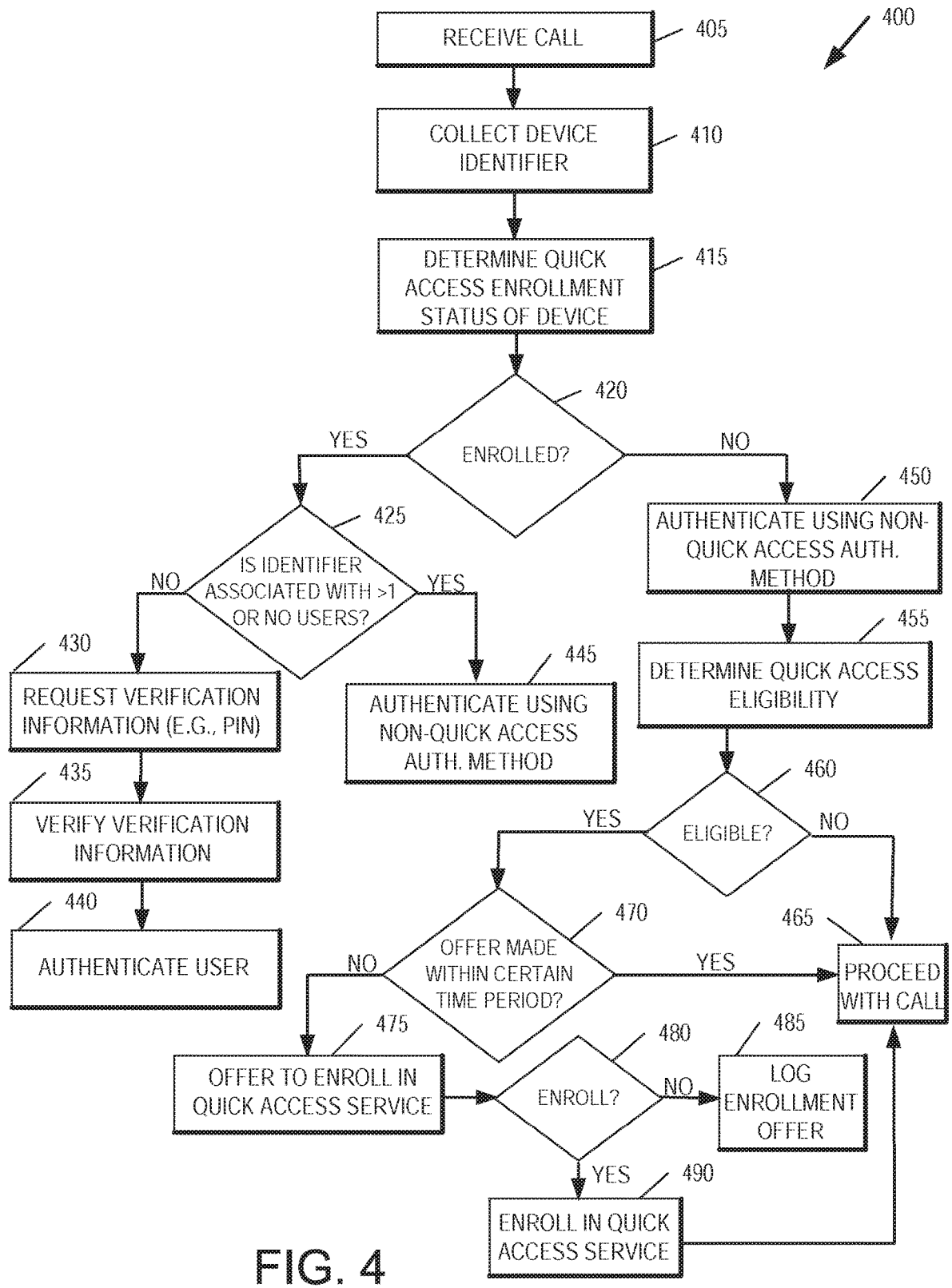
FIG. 4 is a flowchart illustrating a set of operations for enrolling a user and/or device in a quick access service and authenticating the user using the quick access service in accordance with various embodiments of the disclosure.

FIG. 4 is a flowchart illustrating a set of operations 400 for authenticating a user during a voice call as described herein. In some embodiments, fewer than all of the operations are performed, whereas in other embodiments additional operations are performed. Moreover, in some embodiments, the operations may be performed in different orders or in parallel. The operations can be performed by various components in FIGS. 1 and 2 such as memory 205, processor(s) 210, profile module 215, call receiving module 220, enrollment status determining module 225, identification module 230, verification module 235, authentication module 240, enrollment module 245, call history module 250, and GUI generation module 255.

In FIG. 4, receiving operation 405 receives a call at an organization (e.g., phone bank, server, call system, etc.). Collecting identifier operation 410 collects a device identifier, such as a phone number of the device. If the device identifier cannot be obtained, then the quick access service is bypassed and typical authentication procedures are used. In some embodiments, the organization receives a phone number which is used as the device identifier. The organization may determine whether the phone number is a certain number of digits (e.g., ten digits). When the phone number is not the required number of digits, then quick access service is bypassed. When the phone number is the required number of digits, quick access service enrollment may be checked.

Determining quick access enrollment status operation 415 determines whether the device is enrolled in a quick access service. In some embodiments, determining quick access enrollment status operation 415 checks an enrollment status of a user associated with the device identifier to determine whether the user is enrolled in the quick access service. Thereafter, if the user is enrolled in the quick access service, determining quick access enrollment status operation 415 determines whether the device is enrolled in the quick access service (e.g., the user may be enrolled but may have only enrolled certain devices for the quick access service).

When the device is determined to be enrolled in the quick access service, decision operation 420 branches to device identifier checking operation 425. Device identifier checking operation checks whether the device identifier is associated with more than one user. If the device is associated with only one user, then the user may be authenticated using the quick access service and device identify checking operation branches to requesting operation 430. Requesting operation 430 requests verification information from a user (e.g., a PIN) to ensure the identity of the user. Once the verification information is verified using verification operation 435, the user is authenticated in authentication operation 440.

If device identifier checking operation 425 determines that the device identifier is associated with more than one user or with no users, then device identifier checking operation 425 branches to non-quick authentication operation 445 where the user is authenticated using non-quick access service authentication methods may include verifying personally identifiable information (e.g., social security number), verifying a secure token, etc.

If decision operation 420 determines that the device is not enrolled in quick access service, decision operation 420 branches to authentication operation 450. During authentication operation 450, the user is authenticated using a non-quick access service authentication method (e.g., the user provides a social security number and additional personal information).

After authentication using the non-quick access service authentication method, determination operation 455 determines whether the device and/or user is eligible for quick access service (e.g., the user may be ineligible if the user has opted out of the service, the device may be ineligible if it is associated with more than one user profile, etc.). If the device/user is not eligible for the quick access service, eligibility decision operation 460 branches to proceeding operation 465 where the user proceeds with the voice call without receiving an offer of the quick access service.

On the other hand, if determination operation 455 determines the device/user is eligible for quick access service, eligibility decision operation 460 branches to historical offer decision operation 470. Historical offer decision operation 470 determines whether an offer for quick access service was made within a certain time period (e.g., the previous 90 days). When historical offer decision operation 470 determines that an offer was made within the previous time period, historical offer decision operation 470 branches to proceeding operation 465 where the call proceeds without making a quick access service enrollment offer. If historical offer decision operation 470 determines an offer was not made within the previous time period, historical offer decision operation 470 branches to offering operation 475 where an offer is made to the user to enroll the user/device in the quick access service.

In response to the offer generated by offering operation 475, enrolling decision operation 480 receives an indication that the user does want to enroll in the quick access service, does not want to enroll in the quick access service, or receives no response. If the user does not want to enroll or no response is received, enrolling decision operation 480 branches to logging operation 485 that records that the user received an offer to enroll on that date and/or time and for that particular device. After the offer is recorded, the call may proceed in proceeding operation 465. If the user decides to enroll, enrolling decision operation 480 branches to enrollment operation 490 where the user may enroll in quick access service. Enrolling the user may include associating one or more devices with the user and establishing a user verifier such as a PIN. After enrolling, the user may proceed with the call during proceeding operation 465.

Figure 5:
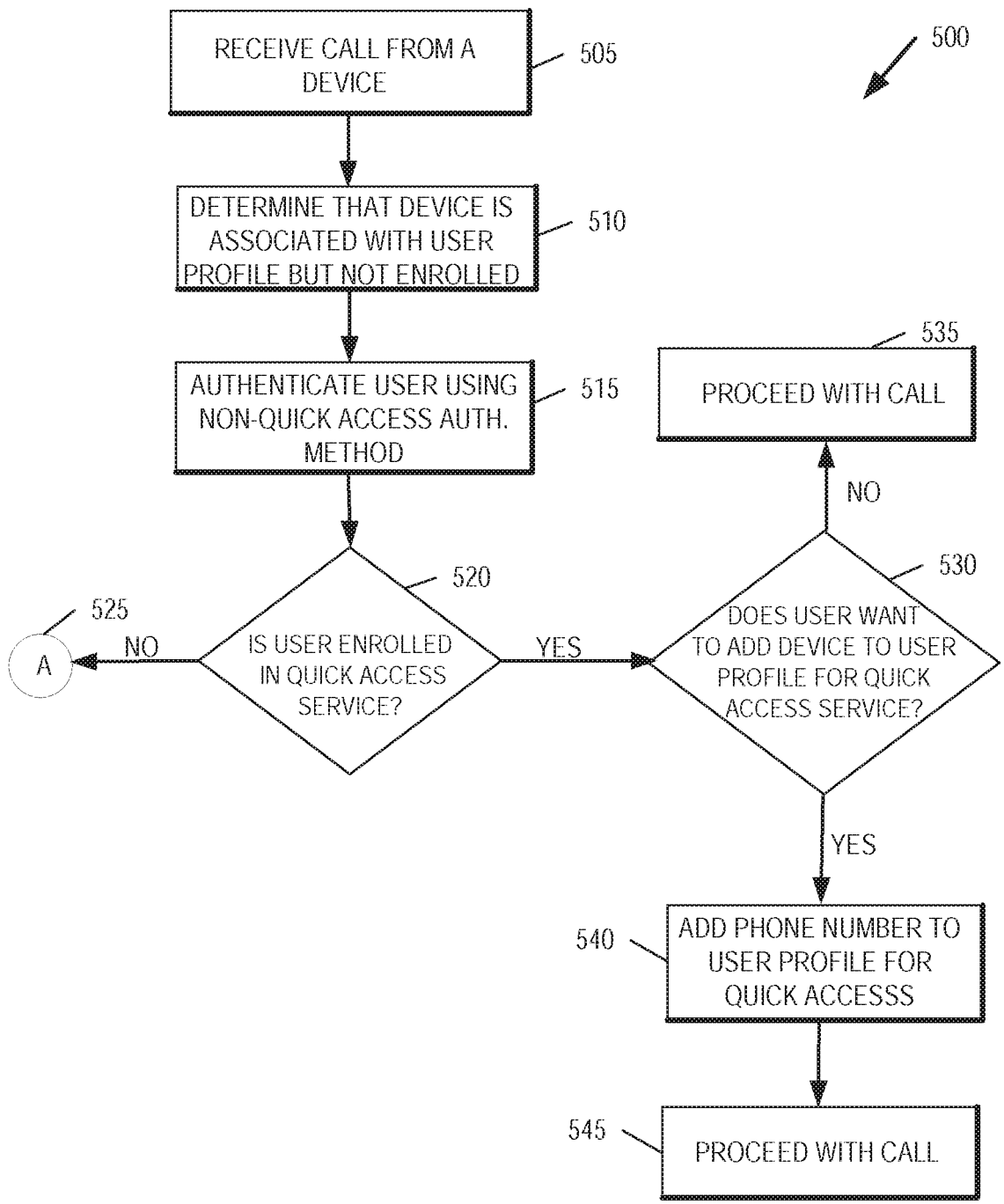
FIG. 5 is a flowchart illustrating a set of operations for enrolling a user and/or device in quick access service and authenticating the user using the quick access service in accordance with various embodiments of the disclosure.
Figure 6:
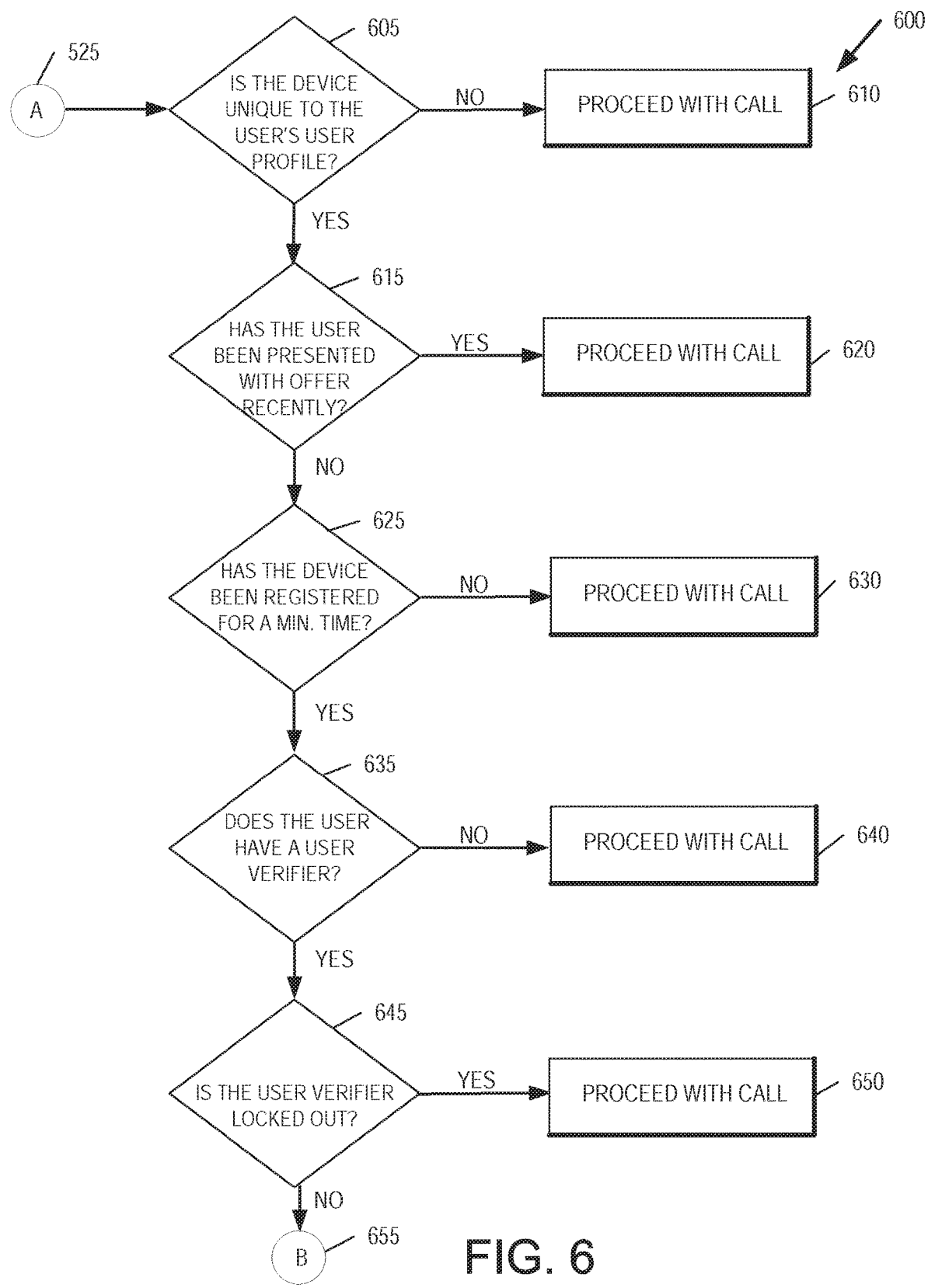
FIG. 6 is a flowchart illustrating a set of operations for enrolling a user in a quick access service in accordance with various embodiments of the disclosure.
Figure 7:
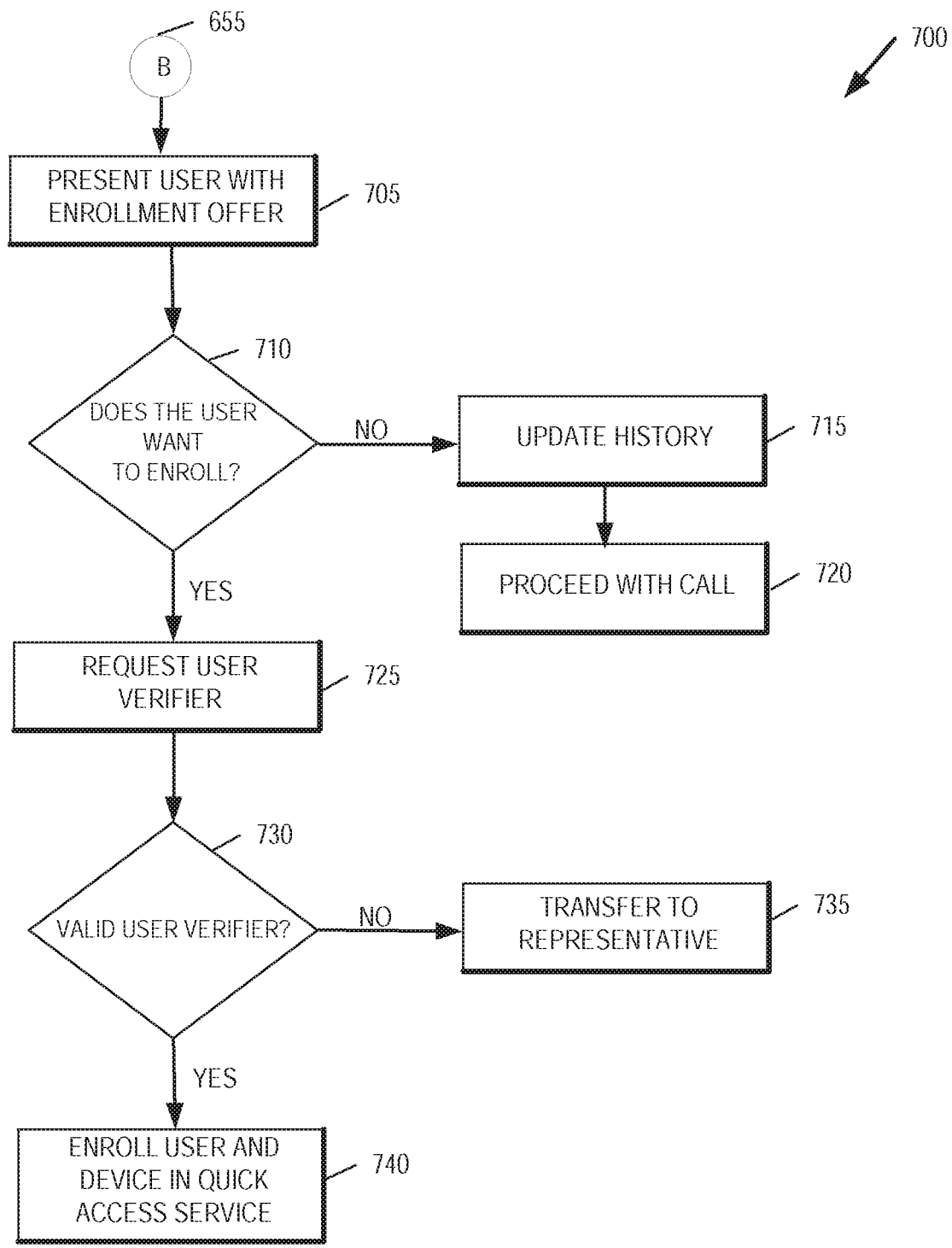
FIG. 7 is a flowchart illustrating a set of operations for enrolling a user in a quick access service in accordance with various embodiments of the disclosure.

FIGS. 5-7 are a flowchart illustrating a set of operations 500, 600, and 700 for authenticating a user during a call and/or enrolling a user in quick access service as described herein. In some embodiments, fewer than all of the operations are performed, whereas in other embodiments additional operations are performed. Moreover, in some embodiments, the operations may be performed in different orders or in parallel. The operations can be performed by various components in FIGS. 1 and 2 such as memory 205, processor(s) 210, profile module 215, call receiving module 220, enrollment status determining module 225, identification module 230, verification module 235, authentication module 240, enrollment module 245, call history module 250, and GUI generation module 255.

Receiving operation 505 receives a call from a device. Using a device identifier, determining device status operation 510 can determine that the device is associated with a user profile but not enrolled in the quick access service. Authenticating operation 515 authenticates the user using non-quick access service authentication methods (e.g., identify with member number, address, birth date, etc., and verify with answer to security question, social security number, etc.). Once the user is authenticated, decision operation 520 determines whether the user is enrolled in the quick access service. If the user is not enrolled in the quick access service, decision operation branches to A, enrollment operation 525, which is further described with regard to FIG. 6.

If the user is enrolled in the quick access service, decision operation branches to decision operation 530 to determine whether the user wants to enroll the device in the quick access service. If the user does not want to enroll the device in the quick access service, the call proceeds in proceeding operation 535. On the other hand, if the user wants to enroll the device in the quick access service, the device is added to the user profile and the quick access service is enabled for the device in enrolling operation 540. The call proceeds in proceeding operation 545.

In FIG. 6, if the user is not enrolled in the quick access system, the system determines whether the user device is unique to the user's user profile in unique device decision operation 605. If the device is not unique to the user's user profile (i.e., the device is associated with other user profiles), the call proceeds without an enrollment offer in proceeding operation 610. If the device is unique to the user's user profile, unique device decision operation 605 branches to recent offer decision operation 615 to determine whether the user has been presented with an offer to enroll in the quick access service recently (e.g., within the past week, six months, etc.). If the user has been presented with an offer within a predetermined period of time, the call proceeds without an enrollment offer in proceeding operation 620. If the user has not been presented with an offer to enroll in the quick access service recently, then recent offer decision operation 615 branches to minimum registration time decision operation 625 to determine whether the device has been associated with the user profile for a minimum period of time (e.g., a month).

If the device has not been associated with the user profile for a minimum period of time, minimum registration time decision operation 625 branches to proceeding operation 630, where the call proceeds without an enrollment offer. If the device has been associated with the user profile for a minimum period of time, minimum registration time decision operation 625 branches to user verifier decision operation 635 to determine whether the user has a user verifier (e.g., PIN). If the user does not have a user verifier, the call proceeds in proceeding operation 640 without an enrollment offer. If the user has a user verifier, user verifier decision operation 635 branches to lock out decision operation 645 in which the system determines whether the user verifier is locked out (e.g., too many attempts). If the user verifier is locked out, lock out decision operation 645 branches to proceeding operation 650 for the call to proceed without an enrollment offer. If the user verifier is not locked out, lock out decision operation 615 branches to B, element 655, which is described in FIG. 7.

In FIG. 7, presenting operation 705 presents the user with an enrollment offer. This offer can be presented verbally on a call, in a text message or email, or any other communication method. Decision operation 710 identifies whether the user wants to enroll in the quick access service. If the user does not want to enroll, updating operation 715 updates the history associated with the user so that the user is not asked again within a certain period of time. In some embodiment, the user is made aware that the user can enroll later (e.g., by calling, accessing a web portal). The call then proceeds in proceeding operation 720.

If the user wants to enroll in the quick access service, the user verifier is requested in requesting operation 725. Decision block 730 determines whether the user verifier received from the user is valid. If the user verifier is not valid or the user does not know the user's user verifier, the user may be transferred to a representative in transferring operation 735. If the user verifier is valid, the user and the user verifier are enrolled in the quick access service in enrolling operation 740.

FIG. 8 illustrates an example of a user interface that may be used in connection with a call system. A user can enroll in the quick access service by selecting "enable" (element 805) on a user interface, such as the user interface depicted in FIG. 8. In some embodiments, a selectable listing of the devices associated with the user may be displayed, and the user may select which devices should be enrolled in the quick access service.

Computer System Overview

Figure 9:
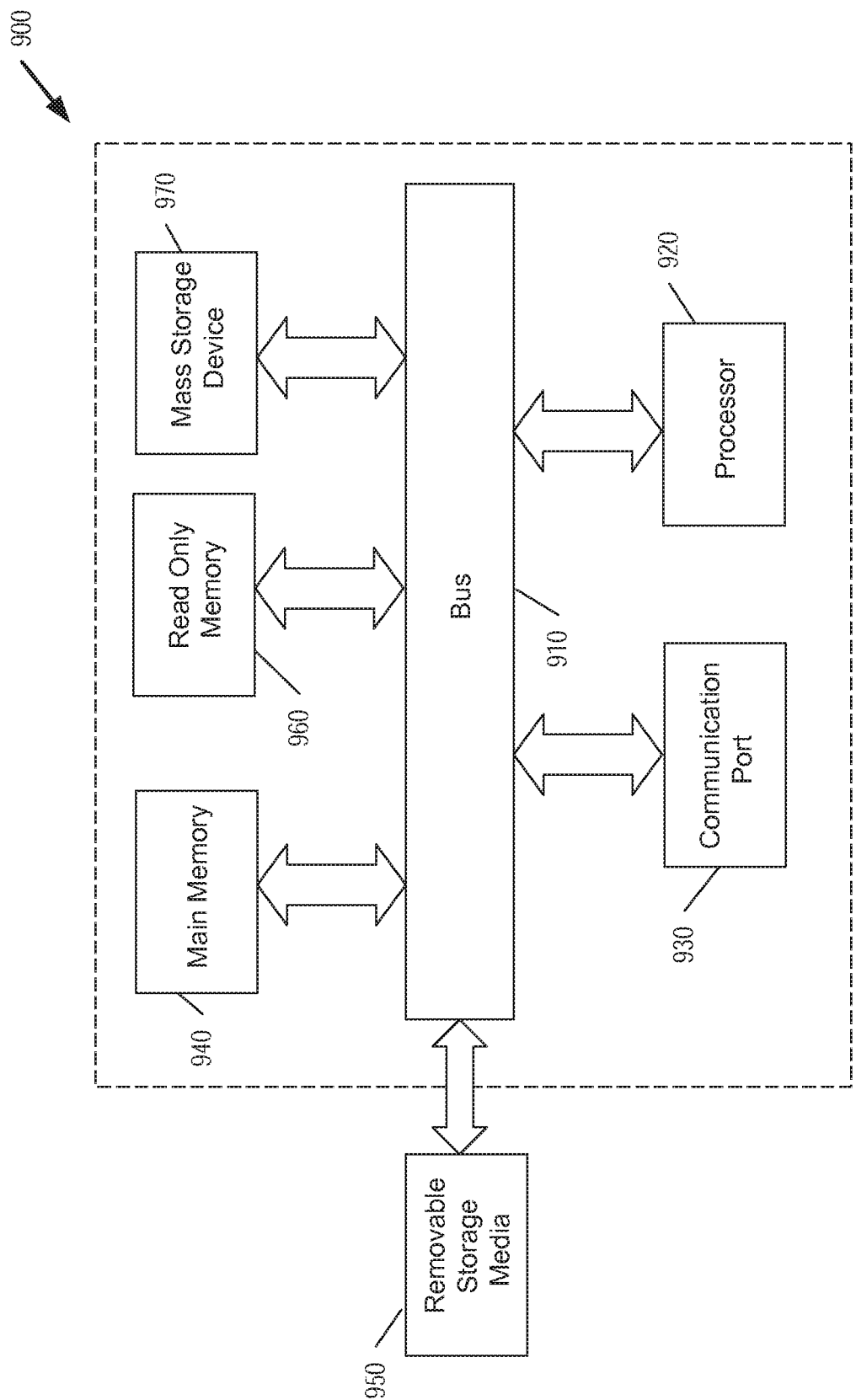
FIG. 9 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which embodiments of the present disclosure may be utilized. According to the present example, the computer system includes a bus 910, at least one processor 920, at least one communication port 930, a main memory 940, a removable storage media 950, a read only memory 960, and a mass storage 970.

Processor(s) 920 can be any known processor, such as, but not limited to, an Intel® Itanium® or Itanium 2® processor(s), or AMD® Opteron® or Athlon MP® processor(s), or Motorola® lines of processors. Communication port(s) 930 can be any of an RS-232 port for use with a modem-based dialup connection, a 10/100 Ethernet port, or a Gigabit port using copper or fiber. Communication port(s) 930 may be chosen depending on a network such a Local Area Network (LAN), Wide Area Network (WAN), or any network to which the computer system 900 connects.

Main memory 940 can be Random Access Memory (RAM), or any other dynamic storage device(s) commonly known in the art. Read only memory 960 can be any static storage device(s) such as Programmable Read Only Memory (PROM) chips for storing static information, such as instructions for processor 920.

Mass storage 970 can be used to store information and instructions. For example, hard disks such as the Adaptec® family of SCSI drives, an optical disc, an array of disks such as RAID, such as the Adaptec family of RAID drives, or any other mass storage devices may be used.

Bus 910 communicatively couples processor(s) 920 with the other memory, storage, and communication blocks. Bus 910 can be a PCI/PCI-X- or SCSI-based system bus, depending on the storage devices used.

Removable storage media 950 can be any kind of external hard-drives, floppy drives, IOMEGA® Zip Drives, Compact Disc—Read Only Memory (CD-ROM), Compact Disc—Re-Writable (CD-RW), Digital Video Disc—Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for authenticating a user on a call. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A computer-implemented method comprising:
receiving, via a communications network, a call from a caller made via a device, wherein the device is identified by a unique identifier;
identifying, by a processor, a user profile of a user associated with the device based on the unique identifier;
determining, by the processor, an enrollment status in a quick access service of the device from the user profile, wherein the quick access service allows the user to be authenticated by providing only a user verifier, wherein the user verifier does not include personally identifiable information;
in response to the device meeting criteria, wherein the criteria includes an enrollment status of the device being not enrolled in the quick access service:
    determining when an enrollment request was last offered to the user;
    determining a length of time between when the last enrollment request was offered and the call; and
    offering to enroll the device into the quick access service in response to determining that the length of time exceeds a threshold period of time.

2. The computer-implemented method of claim 1, wherein the method further comprises passively collecting the unique identifier from the device.

3. The computer-implemented method of claim 1, wherein the unique device identifier is a phone number associated with the device, and wherein the user verifier is a personal identification number.

4. The computer-implemented method of claim 1, further comprising:
in response to the enrollment status of the device being enrolled in the quick access service:
    requesting, from the caller, the user verifier associated with the user profile,
    receiving, from the caller, the user verifier;
    verifying an identity of the caller by comparing the user verifier received from the caller with the user verifier associated with the user profile; and
    authenticating the caller as the user in response to verifying that the user verifier received from the caller matches the user verifier associated with the user profile.

5. The computer-implemented method of claim 1, further comprising: enrolling the device and other devices associated with the user profile into the quick access service in response to the caller accepting the offer to enroll the device.

6. The computer-implemented method of claim 1, wherein the criteria includes a minimum length of time the device has been associated with the user profile, and wherein the method further comprises: in response to the device being associated with the user profile for less than the minimum length of time:
    requesting the personally identifiable information prior to authenticating the caller; and
    authenticating the caller as the user in response to verifying the personally identifiable information.

7. The computer-implemented method of claim 1, wherein the criteria includes the device being associated with one user profile, and wherein the method further comprises: in response to the device being associated with zero user profiles or more than one user profile:
    requesting personally identifiable information prior to authenticating the caller; and
    authenticating the caller as the user in response to verifying the personally identifiable information.

8. A non-transitory, computer-readable medium storing instructions that, when executed by at least one computing device, cause the computing device to perform operations comprising:
receiving, via a communications network, a call from a caller made via a device, wherein the device is identified by a unique identifier;
identifying a user profile of a user associated with the device based on the unique identifier;
determining an enrollment status in a quick access service of the device from the user profile, wherein the quick access service allows the user to be authenticated by providing only a user verifier, wherein the user verifier does not include personally identifiable information;
in response to the device meeting criteria, wherein the criteria includes an enrollment status of the device being not enrolled in the quick access service:
    determining when an enrollment request was last offered to the user;
    determining a length of time between when the last enrollment request was offered and the call; and
    offering to enroll the device into the quick access service in response to determining that the length of time exceeds a threshold period of time.

9. The non-transitory, computer-readable medium of claim 8, wherein the operations further comprise: passively collecting the unique identifier from the device.

10. The non-transitory, computer-readable medium of claim 8, wherein the unique device identifier is a phone number associated with the device, and wherein the user verifier is a personal identification number.

11. The non-transitory, computer-readable medium of claim 8, wherein the operations further comprise:
in response to the enrollment status of the device being enrolled in the quick access service:
    requesting, from the caller, the user verifier associated with the user profile,
    receiving, from the caller, the user verifier;
    verifying an identity of the caller by comparing the user verifier received from the caller with the user verifier associated with the user profile; and
    authenticating the caller as the user in response to verifying that the user verifier received from the caller matches the user verifier associated with the user profile.

12. The non-transitory, computer-readable medium of claim 8, wherein the operations further comprise: enrolling the device and other devices associated with the user profile into the quick access service in response to the caller accepting the offer to enroll the device.

13. The non-transitory, computer-readable medium of claim 8, wherein the criteria includes a minimum length of time the device has been associated with the user profile, and wherein the operations further comprise: in response to the device being associated with the user profile for less than the minimum length of time:
    requesting the personally identifiable information prior to authenticating the caller; and
    authenticating the caller as the user in response to verifying the personally identifiable information.

14. The non-transitory, computer-readable medium of claim 8, wherein the criteria includes the device being associated with one user profile, and wherein the operations further comprise: in response to the device being associated with zero user profiles or more than one user profile:

requesting personally identifiable information prior to authenticating the caller; and authenticating the caller as the user in response to verifying the personally identifiable information.

15. A system comprising:

at least one processor;

at least one memory comprising instructions configured to cause the at least one processor to perform a method comprising:

receiving, via a communications network, a call from a caller made via a device, wherein the device is identified by a unique identifier;

identifying a user profile of a user associated with the device based on the unique identifier;

determining an enrollment status in a quick access service of the device from the user profile, wherein the quick access service allows the user to be authenticated by providing only a user verifier, wherein the user verifier does not include personally identifiable information;

in response to the device meeting criteria, wherein the criteria includes an enrollment status of the device being not enrolled in the quick access service:

determining when an enrollment request was last offered to the user;

determining a length of time between when the last enrollment request was offered and the call; and offering to enroll the device into the quick access service in response to determining that the length of time exceeds a threshold period of time.

16. The system of claim 15, wherein the method performed by the at least one processor further comprises: passively collecting the unique identifier from the device.

17. The system of claim 15, wherein the method performed by the at least one processor further comprises:

in response to the enrollment status of the device being enrolled in the quick access service:

requesting, from the caller, the user verifier associated with the user profile, receiving, from the caller, the user verifier;

verifying an identity of the caller by comparing the user verifier received from the caller with the user verifier associated with the user profile; and authenticating the caller as the user in response to verifying that the user verifier received from the caller matches the user verifier associated with the user profile.

18. The system of claim 15, wherein the method performed by the at least one processor further comprises: enrolling the device and other devices associated with the user profile into the quick access service in response to the caller accepting the offer to enroll the device.

19. The system of claim 15, wherein the criteria includes a minimum length of time the device has been associated with the user profile, and wherein the method performed by the at least one processor further comprises: in response to the device being associated with the user profile for less than the minimum length of time:

requesting personally identifiable information prior to authenticating the caller; and authenticating the caller as the user in response to verifying the personally identifiable information.

20. The system of claim 15, wherein the criteria includes the device being associated with one user profile, and wherein the method performed by the at least one processor further comprises: in response to the device being associated with zero user profiles or more than one user profile:

requesting the personally identifiable information prior to authenticating the caller; and authenticating the caller as the user in response to verifying the personally identifiable information.

\* \* \* \* \*